US012736189B2

(12) United States Patent
Alazmi et al.

(10) Patent No.: US 12,736,189 B2
(45) Date of Patent: Sep. 15, 2026

(54) METHODS AND SYSTEMS FOR SAND REMOVAL

(71) Applicant: SAUDI ARABIAN OIL COMPANY, Dhahran (SA)

(72) Inventors: Mutlaq Alazmi, Tanajib (SA); Ahmad Aldhafeeri, Tanajib (SA); Abdullaziz Alghanim, Tanajib (SA); Naser Alsubaiei, Tanajib (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 102 days.

(21) Appl. No.: 18/784,157

(22) Filed: Jul. 25, 2024

(65) Prior Publication Data

US 2026/0029092 A1 Jan. 29, 2026

(51) Int. Cl.
*F17D 3/00* (2006.01)

(52) U.S. Cl.
CPC .................................... *F17D 3/00* (2013.01)

(58) Field of Classification Search
CPC ........ E21B 37/02; E21B 37/04; E21B 37/045; E21B 27/00; E21B 43/35
See application file for complete search history.

(56) References Cited

U.S. PATENT DOCUMENTS 5,242,021 A * 9/1993 Gadelle .................. C09K 8/424 166/292
8,945,256 B2 * 2/2015 Hemstock .......... B01D 21/2405 96/182

FOREIGN PATENT DOCUMENTS

| | | | |
|---|---|---|---|
| AU | 2014366820 B2 | 9/2018 | |
| CN | 104500021 A | 4/2015 | |
| CN | 207608352 U | 7/2018 | |
| CN | 207829827 U | 9/2018 | |
| CN | 209696473 U | 11/2019 | |
| CN | 110668609 A | 1/2020 | |
| CN | 219528989 U | 8/2023 | |
| WO | WO-03036020 A1 * | 5/2003 | ............. E21B 27/04 |

* cited by examiner

*Primary Examiner* — Catherine Loikith
(74) *Attorney, Agent, or Firm* — Osha Bergman Watanabe & Burton LLP

(57) ABSTRACT

In methods, systems, and devices involving sand removal from an offshore facility, a scraper device includes a scraper body comprising a scraper flange configured to clean an inner wall of a pipeline. The scraper device includes a sand collection chamber disposed within the scraper body and configured to receive a quantity of sand. The scraper device includes a chamber door operatively connected to the scraper body and configured to enclose the sand collection chamber. The scraper device is configured to be loaded via a sand loading system with a quantity of sand from a desanding system, loaded into the pipeline, and transported through the pipeline from the offshore facility.

19 Claims, 4 Drawing Sheets

METHODS AND SYSTEMS FOR SAND REMOVAL

BACKGROUND

Hydrocarbons are produced from wells that extend into sediments and rock of the Earth's crust. Production tubing extends from production facilities on the surface into the well to extract hydrocarbons from the rock. Particles of rock may break-off and enter the production tubing. The particles of rock, such as sand, needs to be transported from the production facilities. Current transportation utilizes motorized vehicles to retrieve sand from the offshore facilities and transport the sand to onshore facilities for offloading and disposal. The motorized vehicles are usually powered by fossil fuels.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, the techniques described herein relate to a scraper device for removal of sand from an offshore facility having a pipeline. The scraper device includes a scraper body, a sand collection chamber, and a chamber door. The scraper body includes a scraper flange configured to clean an inner wall of the pipeline. The sand collection chamber may be disposed within the scraper body and configured to receive a quantity of sand. The chamber door is operatively connected to the scraper body and is configured to enclose the sand collection chamber. The scraper device is configured to be transported through the pipeline.

In some aspects, the techniques described herein relate to a system for sand removal from an offshore facility having a pipeline. The system includes a desanding system, a scraper device, and a sand loading system. The desanding system is configured to discharge a quantity of sand. The scraper device includes a scraper body. The scraper body includes a scraper flange configured to scrape an inner wall of the pipeline, a sand collection chamber disposed within the scraper body and configured to receive the quantity of sand discharged from the desanding system, and a chamber door operatively connected to the scraper body and configured to enclose the sand collection chamber. The scraper device is configured to be transported through the pipeline. The sand loading system is operatively connected to the desanding system. The sand loading system is configured to load the scraper device into a scraper loading chamber. The sand loading system is configured to translate the scraper device from the scraper loading chamber into a sand loading chamber through a separation gate. The sand loading system is configured to position the scraper device to receive the quantity of sand from the desanding system using the separation gate and the sand loading chamber. The sand loading system is configured to receive the quantity of sand from the desanding system into the sand collection chamber of the scraper device. The sand loading system is configured to pressurize the sand loading chamber. The sand loading system is configured to translate the scraper device into the pipeline from the sand loading chamber. The sand loading system is configured to transport the scraper device from the offshore facility through the pipeline.

In some aspects, the techniques described herein relate to a method for sand removal from an offshore facility having a pipeline. The method includes loading a scraper device into a scraper loading chamber. The scraper device includes a sand collection chamber. The method includes translating the scraper device from the scraper loading chamber into a sand loading chamber through a separation gate. The method includes positioning the scraper device to receive a quantity of sand from a desanding system using the separation gate and the sand loading chamber. The method includes opening a chamber door of the scraper device. The method includes receiving the quantity of sand into the sand collection chamber from the desanding system. The method includes closing the chamber door to enclose the sand collection chamber. The method includes pressurizing the sand loading chamber. The method includes translating the scraper device into the pipeline from the sand loading chamber. The method includes transporting the scraper device from the offshore facility through the pipeline.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
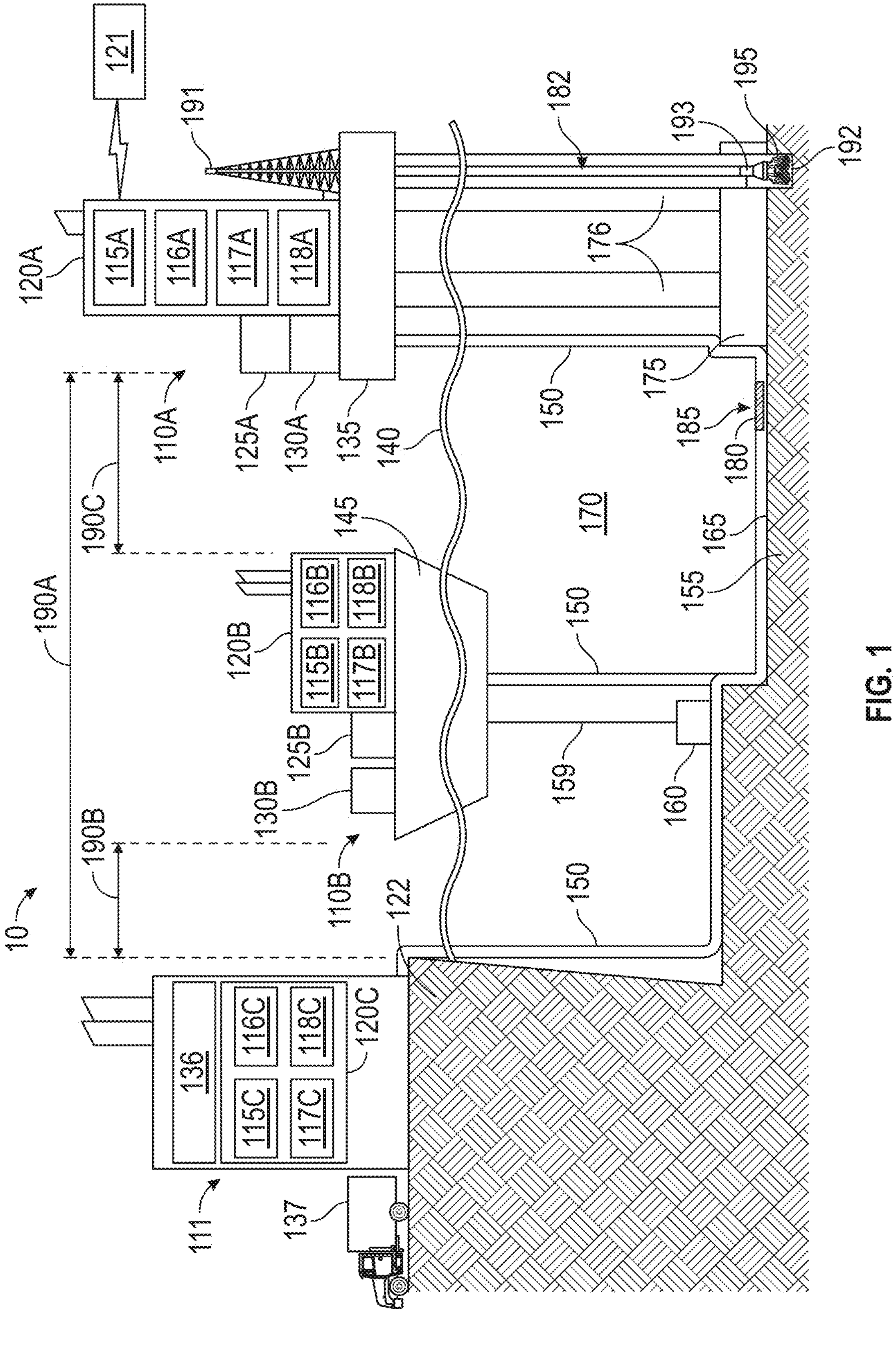
FIG. 1 depicts a sand removal system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise.

Terms such as "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

FIG. 1 shows a schematic diagram illustrating a system for removal of sand (hereafter "sand removal system" (10)) that includes an offshore facility (110A, 110B) and an onshore facility (111) located at different locations separated over large distances (190A, 190B, 190C) in accordance with one or more embodiments. The large distances (190A, 190B, 190C), not drawn to scale, are shown to be over a large body of water (170) (e.g., an ocean, a sea, or a large lake). In some embodiments, the offshore facility (110A) is shown located on an offshore platform (135). In some embodiments, the offshore facility (110B) is shown located on a permanently moored platform (145). In some embodiments, the offshore facility (110A, 110B) includes one or more pipelines (150) and is fluidly connected to the onshore facility (111) and/or another offshore facility using the one or more pipelines (150) laid on an underwater floor (165) (e.g., seabed) over the large distances (190A, 190B, 190C). The pipeline (150) may be pressurized and is configured to transport various types of fluid such as a production fluid (182).

In some embodiments, each facility (e.g., the offshore facility (110A, 110B) and the onshore facility (111)) may include a production unit (120A, 120B, 120C). The offshore facility (110A, 110B) may include a desanding system (125A, 125B), and a sand loading system (130A, 130B) at the offshore platform (135) and/or the permanently moored platform (145). The onshore facility (111) may include a sand offloading system (136). The onshore facility (111) is located at an onshore platform (122), which may be an onshore location such as a lot of land located on a large area of a continent or an island.

The permanently moored platform (145) may be an offshore location that is configured to remain fixed in a geological location above a water level (140), such as a boat or platform configured for withstanding large weight loads. The permanently moored platform (145) may be fixed in the geological location using an anchor (160) connected through mooring cables (159).

The permanently moored platform (145) may be an offshore location such as a main deck positioned above the water level (140) and fixed to a geological location for performing production operations. The permanently moored platform (145) may be fixed in the geological location using an anchor such as piles (175) connected through risers (176).

As shown in FIG. 1, the production unit (120A, 120B, 120C) is configured to extract the production fluid (182) from the reservoir and to process the production fluid (182). In some embodiments, production unit systems and equipment may be distributed between both the offshore facility (110A, 110B) and the onshore facility (111). The production unit (120A, 120B, 120C) may include one or more production wells (191), one or more control systems (115A, 115B, 115C), one or more gathering systems (116A, 116B, 116C), one or more processing plants (117A, 117B, 117C), one or more user devices (118A, 118B, 118C), and/or various network elements (not shown). In some embodiments, the control system (115A, 115B) on the offshore facility (110A, 110B) may be a primary control system that controls and monitors the sand removal system (10). The control system (115C) on the onshore facility may be a secondary control system that coordinates with the primary control system. In one or more embodiments, the primary control system may be a facility server. The facility server may include control and monitoring hardware and software to control operations in the sand removal system (10).

In some embodiments, various types of system data (121) are collected over the sand removal system (10) (e.g., production data, sand levels, and/or sand transport time) regarding one or more sand removal components providing system feedback throughout the sand removal system (10). For example, the primary control system may be configured to monitor sand levels within the sand removal system (10) and initiate a sand removal method when sand levels reach a predetermined sand level threshold.

In some embodiments, the user device (118A, 118B, 118C) may communicate with the control system (115A, 115B, 115C) system data (121) to a particular user. Based on the system reports, a user device may also manage various commands for performing one or more sand removal operations based on one or more user selections. The user device (118A, 118B, 118C) may be a personal computer, a handheld computer device such as a smartphone or personal digital assistant, or a human machine interface (HMI). For example, a user may interact with a user interface (e.g., graphical user interface presented on a display device) to inquire regarding sand levels, sand level thresholds and various system statuses. Through user selections or automation, the control system (115A, 115B, 115C) may identify system integrity issues and may implement maintenance operations accordingly.

Furthermore, the production well (191) may include a well system (192) located in a well environment that includes a hydrocarbon reservoir ("reservoir") located in a subsurface hydrocarbon-bearing formation (155) (hereafter "formation"). The formation (155) may include a porous or fractured rock formation that resides underground, beneath the earth's surface (e.g., the underwater floor (165)). The formation (155) and the reservoir may include different layers of rock having varying characteristics, such as varying degrees of permeability, porosity, and resistivity. The well system (192) may facilitate the extraction of hydrocarbons (or "production") from the reservoir.

In some embodiments, the well system (192) includes a wellbore and a well sub-surface system (193) including a completion system (195) disposed in the wellbore. The wellbore may include a bored hole that extends from the earth's surface (e.g., the underwater floor (165)) into a target zone of the hydrocarbon-bearing formation, such as the reservoir. The wellbore may facilitate the circulation of drilling fluids during drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the formation (155) or the reservoir during monitoring operations (e.g., during in situ logging operations).

The completion system may include perforations and a completion package designed for extracting production fluid (182) from the reservoir. The control system (115A, 115B, 115C) may be configured to control various operations of the well system (192), such as well production operations, well completion operations, well maintenance operations, and reservoir monitoring, assessment and development operations. The well sub-surface system may include sensors and wire configured to monitor and communicate production data with the control system (115A, 115B, 115C).

In some embodiments, the one or more production wells (191) are coupled to the gathering system (116A, 116B, 116C). Each gathering system (116A, 116B, 116C) (also referred to as a collecting system or gathering facility) may include various hardware arrangements and pipe components that connect flowlines from several production wells into a single gathering line. For example, each gathering system (116A, 116B, 116C) may include flowline networks, headers, pumping facilities, separators, emulsion treaters, compressors, dehydrators, tanks, valves, regulators, and/or associated equipment. In particular, a remote header may have production valves and testing valves to control a mixed stream for a flowline of a respective gas well.

Thus, a gathering system may direct various hydrocarbon fluids to a processing or testing facility, such as a processing plant. In some embodiments, each gathering system (116A, 116B, 116C) manages individual fluid ratios (e.g., a particular gas-to-water ratio or condensate-to-gas ratio) as well as supply rates of oil, gas, and water. For example, each gathering system (116A, 116B, 116C) may assign a particular production value or ratio value to a particular production well by opening and closing selected valves among the remote headers and using individual metering equipment or separators. Furthermore, each gathering system (116A, 116B, 116C) may be a radial system or a trunk line system. A radial system may bring various flowlines to a single central header. In contrast, a trunk-line system may use several remote headers to collect oil and gas from fields that cover a large geographic area. Once collected, the gathering system (116A, 116B, 116C) may transport and control the flow of oil or gas to a storage facility, a gas processing plant, or a shipping point.

In accordance with one or more embodiments, the processing plant systems and equipment may be distributed on both the offshore facility (110A, 110B) and the onshore facility (111). In the case of a gas-bearing reservoir for example, the processing plant (117A, 117B, 117C) may refer to various types of industrial plants such as a gas processing plant, a gas cycling plant, or a compressor plant. A gas processing plant may be a facility that processes natural gas to recover natural gas liquids (e.g., condensate, natural gasoline, and liquefied petroleum gas) and sometimes other substances such as sulfur. A gas cycling plant may refer to an oilfield installation coupled to a gas-condensate reservoir. In particular, a gas cycling plant may extract various liquids from natural gas. Consequently, the remaining dry gas may be compressed prior to returning to a producing formation, e.g., to maintain reservoir pressure.

Moreover, various components of natural gas may be classified according to their vapor pressures, such as low pressure liquid (i.e., condensate), intermediate pressure liquid (i.e., natural gasoline), and high pressure liquid (i.e., liquefied petroleum gas). Examples of natural gas liquids include propane, butane, pentane, hexane, and heptane. With respect to compressor plants, a compressor plant may be a facility that includes multiple compressors, auxiliary treatment equipment, and pipeline installations for pumping natural gas over large distances (190A, 190B, 190C). A compressor station may also repressurize gas in large gas pipelines or to link offshore gas fields to their final terminals.

Keeping with processing plants, the processing plant (117A, 117B, 117C) may include production fluid processing equipment that includes hardware and/or software for extracting, separating, treating, and/or disposing of different components of production fluid (182) (e.g., oil, gas, and/or water) associated with production fluid processing. More specifically, the processing plant may extract produced water during the separation of oil or gas from the production fluid (182) acquired from the production well (192).

In accordance with one or more embodiments, the production fluid (182) may include natural sand particulates (hereafter "sand") composed of natural minerals (e.g., quartz, feldspar, lithics, and the like) that may have dissociated from geological formations during extraction of the production fluid (182) from the formation (155). The desanding system (125A, 125B) is configured to discharge the quantity of sand (185) from sand that has been separated from the production fluid (182). The quantity of sand (185) may include at least a portion of the production fluid (182) and/or injected water from a water supply that was not fully separated so that the quantity of sand may be a slurry.

Figure 4:
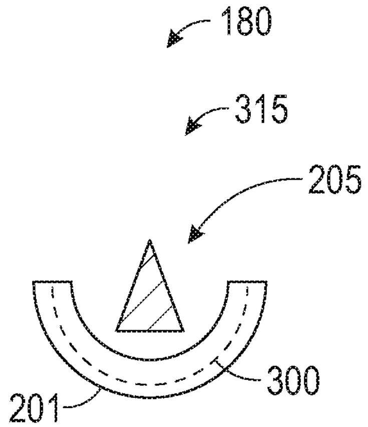
FIG. 4 shows a cross-sectional view of a scraper device in accordance with one or more embodiments.
Figure 5:
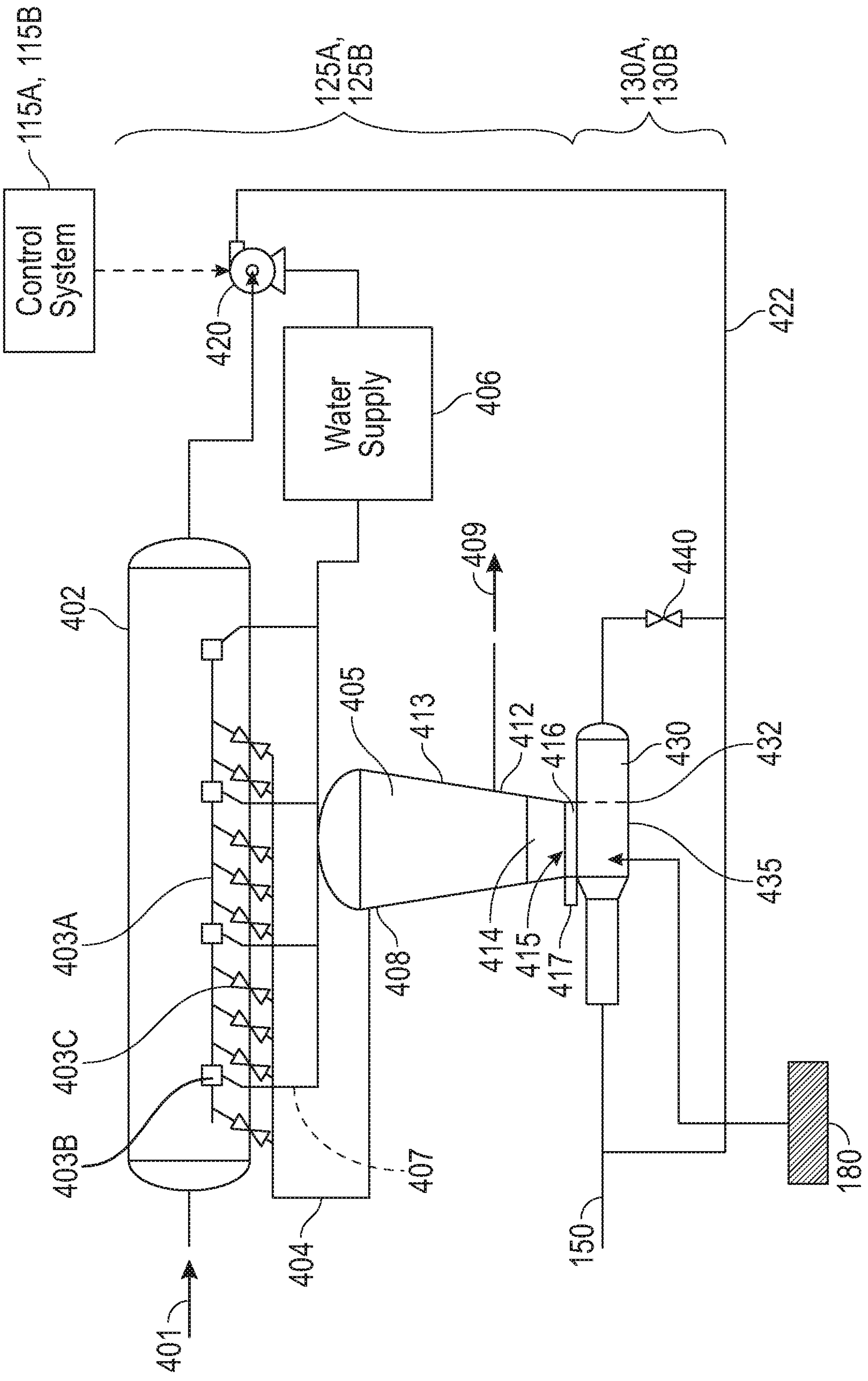
FIG. 5 depicts a desanding system and a sand loading system in accordance with one or more embodiments.
Figure 6:
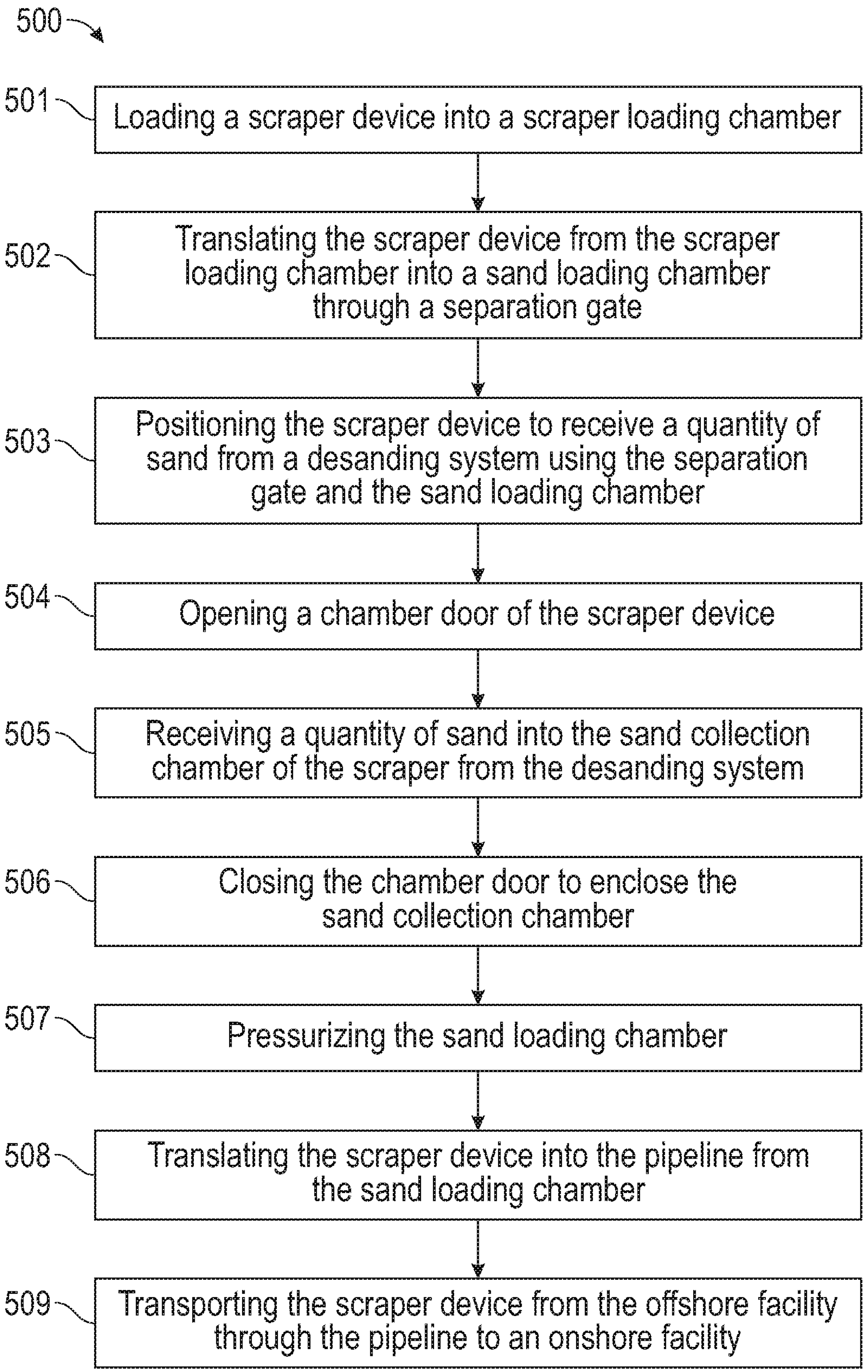
FIG. 6 depicts a sand removal flowchart in accordance with one or more embodiments.

In accordance with one or more embodiments, the desanding system (125A, 125B) may be configured to separate sand from the production fluid (182) as described in relation to FIG. 5. The quantity of sand (185) may be transported from the offshore facilities (110A, 110B) to the onshore facility (111). The quantity of sand (185) may be disposed in a scraper device (180) as described in relation to FIG. 2, FIG. 3, and FIG. 4. The sand loading system (130A, 130B) is configured to load the quantity of sand (185) in the scraper device (180) and translate the scraper device (180) into the pipeline (150).

In some embodiments, the onshore facility (111) is configured to receive the scraper device (180) within the pipeline (150). In some embodiments, the sand offloading system (136) is configured to retrieve the scraper device (180) from the pipeline (150) and to offload the quantity of sand (185) from the scraper device (180). The sand offloading system (136) includes hardware components operatively connected to offload the quantity of sand (185). For example, the sand offloading system (136) may include a vacuum system for unloading the quantity of sand (185) from the scraper device (180). The vacuum system is configured to remove through suction the quantity of sand (185) from the scraper device (185).

The onshore facility (111) may include a transport vehicle (137) that is configured to transport the quantity of sand (185) to be disposed of or to a sand processing facility to further treat the quantity of sand (185) for cleaning and disposal or for cleaning and repurposing the quantity of sand (185). The transport vehicle (137) may include a truck configured to transport the quantity of sand (185). The sand offloading system (136) may include a lifting device configured to lift the scraper device (180) and to offload the quantity of sand (185) into the transport vehicle (137), for example, by dumping the sand into the transport vehicle (137) and/or the vacuum system is configured offload the quantity of sand (185) into the transport vehicle (137) through suction. In some embodiments, the vacuum system may be a vacuum truck that may also be the transport vehicle (137) configured to transport the quantity of sand (185).

With respect to produced water, produced water may be a kind of brackish and saline water brought to the surface from underground formations. In particular, oil and gas reservoirs may have water in addition to hydrocarbons in various zones underneath the hydrocarbons, and even in the same zone as the oil and gas. However, most produced water is of very poor quality and may include high levels of natural salts and minerals that have dissociated from geological formations in the target reservoir.

Likewise, produced water may also acquire dissolved constituents from fracturing fluids (e.g., substances added to the fracturing fluid to help prevent pipe corrosion, minimize friction, and aid the fracking process). However, through various water treatments, produced water may be reused in one or more wells or the sand removal system (10), e.g., through waterflooding where produced water is injected into the reservoirs or agitating the production fluid (182) in a primary vessel. By injecting produced water into an injection well, the injected water may force oil and gas to one or more production wells.

Keeping with produced water, each processing plant (117A, 117B, 117C) may use various treatment technologies in order to reuse or dispose of produced water, such as conventional treatments and advanced treatments. For example, conventional treatments may include flocculation, coagulation, sedimentation, filtration, and lime softening water treatment processes. Thus, conventional treatment processes may include functionality for removing suspended solids, oil and grease, hardness compounds, and other insoluble water components.

With advanced treatment technologies, water processing equipment may include functionality for performing reverse osmosis membranes, thermal distillation, evaporation and/or crystallization processes. These advanced treatment technologies may treat dissolved solids, such as chlorides, salts, barium, strontium and sometimes dissolved radionuclides. In some embodiments, produced water is sent to a wastewater treatment plant that is equipped to remove barium and strontium, e.g., using sulfate precipitation. Outside of treatments for reusing produced water, water processing equipment may dispose of produced water using various water management options. For example, produced water may be disposed in saltwater wells. Likewise, produced water may also be eliminated through a deep well injection.

In some embodiments, the production unit (120A, 120B, 120C) may include one or more pipe components, and one or more storage facilities. The pipe components are fluidly coupled to the various systems and components of the sand removal system (10). Different forms of production fluids may be stored in various storage facilities that include surface containers as well as various underground reservoirs, such as depleted gas reservoirs, aquifer reservoirs and salt cavern reservoirs.

In some embodiments, the pipeline (150) may include one or more pipeline components such as pipeline segments, pipeline connections, and pipeline valves fluidly connected to form the pipeline (150). The pipeline (150) may extend over large distances (190A, 190B, 190C). The pipeline (150) is configured to allow flow of the production fluid (182) from the offshore facility (110A, 110B) to the onshore facility (111). As the production fluid (182) is transported within the pipeline (150), the pipeline (150) may accumulate impurities from the production fluid, such as "sludge" (e.g., degraded hydrocarbons), mineral buildup, and the like. The scraper device (180) is configured to clean the pipeline (150) such as scrapping an inner wall of the pipeline (150).

With respect to control systems, each control system (115A, 115B, 115C) may include hardware and/or software that monitors and/or operates equipment, such as at the production well (191) or in the processing plant (117A, 117B, 117C). Examples of control systems may include one or more of the following: a sand removal control system, an emergency shut down (ESD) system, a safety control system, a supervisory control and data acquisition (SCADA) system, a video management system (VMS), process analyzers, other industrial systems, etc.

In particular, a control system may include a programmable logic controller (PLC) that may control valve states, sand levels, fluid levels, pipe pressures, warning alarms, pressure releases and/or various hardware components for implementing a gas flowline. Thus, a PLC may be a ruggedized computer system with functionality to withstand vibrations, extreme temperatures, wet conditions, and/or dusty conditions, such as those around a gas plant, gas well, and/or a gathering system.

With respect to distributed control systems, a distributed control system may be a computer system for managing various processes at a facility using multiple control loops. As such, a distributed control system may include various autonomous controllers (such as remote terminal units (RTUs)) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Keeping with control systems, a control system may be coupled to facility equipment. Facility equipment may include various machinery such as one or more hardware components, such as pipe components, that may be monitored using one or more sensors. Examples of hardware components coupled to a control system may include crude oil preheaters, heat exchangers, pumps, valves, compressors, loading racks, and storage tanks among various other types of hardware components. Hardware components may also include various network elements or control elements for implementing control systems, such as switches, routers, hubs, PLCs, remote terminal units, user equipment, or any other technical components for performing specialized processes. Examples of sensors may include pressure sensors, flow rate sensors, temperature sensors, torque sensors, rotary switches, weight sensors, position sensors, microswitches, hydrophones, accelerometers, etc.

Those skilled in the art will appreciate that FIG. 1 is an illustrative example of a distribution system in accordance with embodiments disclosed herein, and that components shown may be omitted, duplicated, or combined without departing from the scope herein. For example, while two offshore facilities and a single onshore facility are shown in FIG. 1, there may be any number of offshore facilities and onshore facilities associated with the sand removal system (10) without departing from the scope of the invention. Further, while only one well is shown in FIG. 1, there may be any number of wells associated with each offshore and/or onshore facilities without departing from the scope of the invention. While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
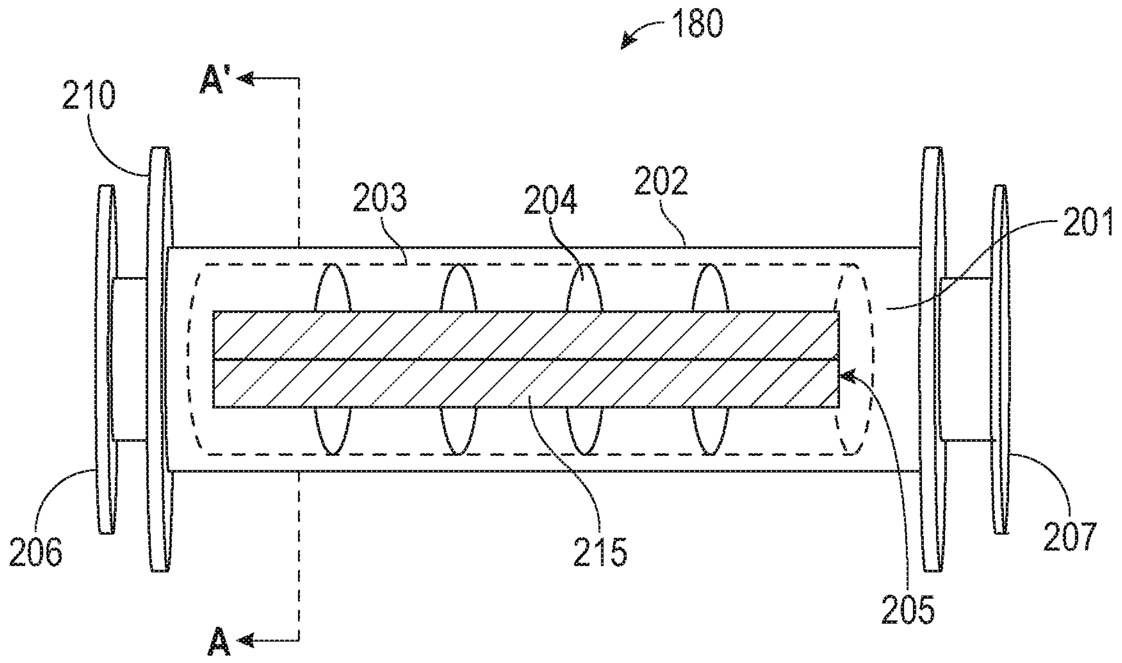
FIG. 2 depicts a scraper device in accordance with one or more embodiments.

FIG. 2 illustrates the scraper device (180) in accordance with one or more embodiments. The scraper device (180) is configured to remove sand (185) from the offshore facility (110A, 110B) that is fluidly connected to the pipeline (150). The scraper device (180) is configured to be transported in the pipeline (150). In some embodiments, the scraper device (180) may be configured to be transported in a pressurized pipeline. The scraper device (180) includes a scraper body (201), a scraper flange (210) configured to clean an inner wall of the pipeline (150), a sand collection chamber (205) disposed within the scraper body (201). The sand collection chamber (205) is configured to receive the quantity of sand (185).

In some embodiments, the scraper body (201) includes a body outer wall (202), a body opening (203), a first end (206), and a second end (207). The scraper body (201) may be any shape suitable for being transported through the pipeline (150) such as cylindrical or spherical. The body outer wall (202) may be a rigid outer wall configured to provide support for the scraper body (201) to hold the quantity of sand (185) and to be transported through the pipeline (150). The body opening (203) may be any shape suitable for receiving the quantity of sand (185). In some embodiments, the scraper body (201) may include one or more structural supports (204) such as ribs that are disposed within the scraper body (201) so as to provide structural strength to the scraper body (201).

In some embodiments, the scraper flange (210) may be disposed on either of the first end (206) or the second end (207) or on both ends of the scraper body (201). The scraper flange (210) may be disposed circumferentially around the scraper body (201). The scraper flange (210) extends outward from the scraper body (201). The scraper flange (210) is configured to scrape an inner wall of the pipeline (150). The scraper flange (210) may be constructed of any material suitable to scrape and/or clean the inner wall of the pipeline (150) such as plastic. The scraper flange (210) may include one or more plastic discs disposed on the scraper body (201). The scraper flange (210) may include one or more blades configured to scrape the inner wall of the pipeline (150). In some embodiments, the scraper flange (210) may include brushes configured to scrape the inner wall of the pipeline (150).

In accordance with one or more embodiments, the scraper device (180) may include a sand distribution device (215) disposed in the sand collection chamber (205). The sand distribution device (215) is configured to distribute the quantity of sand (185) within the sand collection chamber (205). In some embodiments, the sand distribution device (215) may include a distribution wedge disposed in the sand collection chamber (205) and is configured to divert the quantity of sand (185) laterally to each side of the distribution wedge. In some embodiments, the sand distribution device (215) may include supports connected to the scraper body (201) to suspend the sand distribution device (215) in a substantially central location within the sand collection chamber (205) to divert the quantity of sand (185) laterally. In some embodiments, the sand distribution device (215) may extend from the first end (206) to the second end (207) and may be attached to the scraper body (201) on both ends to support the sand distribution device (215).

In accordance with one or more embodiments, the scraper device (180) is configured to be translated into the pipeline (150) through a scraper loading chamber. The scraper device (180) is configured to be transported through the pipeline (150) by being pushed by the production fluid (182) within the pipeline (150). The production fluid (182) may be pressurized within the pipeline (150) and the flow of production fluid (182) through the pipeline (150) propels the scraper device (180).

Figure 3:
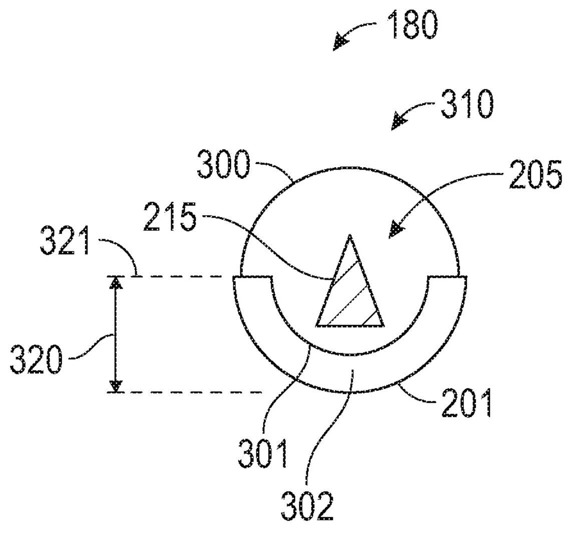
FIG. 3 illustrates a cross-sectional view of a scraper device in accordance with one or more embodiments.

FIGS. 3 and 4 depict a cross-sectional view of the cross-section A-A' as shown in FIG. 2. The scraper device (180) includes a chamber door (300) operatively connected to the scraper body (201). The scraper device (180) includes a closed configuration (310), shown in FIG. 3, and an open configuration (315), shown in FIG. 4. The chamber door (300) is configured to enclose the sand collection chamber (205) in the closed configuration (310). The sand collection chamber (205) is configured to receive the quantity of sand (185) in the open configuration (315).

In some embodiments, the chamber door (300) is configured to slidably pivot circumferentially around the scraper body (201) in order to open and close the sand collection chamber (205). The scraper body (201) may include a body inner wall (301) with a body cavity (302) disposed between the body outer wall (202) and the body inner wall (301). The body cavity (302) is configured to receive the chamber door (300) when opening. The chamber door (300) includes chamber door hardware configured to provide opening and closing functions for the chamber door (300). Chamber door hardware may include door hinges, rollers, fasteners, and the like operatively connected to the chamber door (300) and the scraper body (201).

The sand collection chamber (205) may be configured to receive the quantity of sand (185). The quantity of sand (185), when disposed in the sand collection chamber (205), may include a sand level (320). The quantity of sand (185) may be metered so that the sand level (320) may not exceed a sand level threshold (321). The sand collection chamber (205) may include a sensor configured to monitor the sand level (320) within the sand collection chamber (205). The sensor may be operatively connected to the control system (115A, 115B) and configured to terminate a sand discharge into the sand collection chamber (205) so as to not exceed the sand level threshold (321).

In some embodiments, the sand distribution device (215) may be oriented so an apex of the sand distribution device (215) is configured to divert the quantity of sand (185) laterally, so the quantity of sand (185) does not accumulate in the center of the sand collection chamber (205) and is diverted to the lateral sides of the sand collection chamber (205) to facilitate an even sand distribution of the quantity of sand (185) within the sand collection chamber (205). In some embodiments, an apex of the sand distribution device (215) may be oriented toward the body opening (203).

FIG. 5 is a schematic diagram of the desanding system (125A, 125B) and the sand loading system (130A, 130B). The desanding system (125A, 125B) is configured to discharge the quantity of sand (185). The sand collection chamber (205) is disposed within the scraper body (201) and is configured to receive the quantity of sand (185) discharged from the desanding system (125A, 125B). The sand loading system (130A, 130B) is operatively connected to the desanding system (125A, 125B). The desanding system (125A, 125B) includes a separator (405) and a transfer pump (420). The sand loading system (130A, 130B) includes a scraper loading chamber (430), a sand loading chamber (435), and an isolation valve (440). The desanding system (125A, 125B) may be operatively connected to any of the systems (e.g., a gathering system and/or a processing plant) of the production unit (120A, 120B, 120C) where sand is needed to be extracted before performing other processing operations. The isolation valve (440) may be used to isolate components of the desanding system (125A, 125B) from the sand loading system (130A, 130B).

The transfer pump (420) may be operatively connected via a pressurization line (422) to the desanding system (125A, 125B) and/or the sand loading system (130A, 130B). The transfer pump (420) may be any pump suitable for pressurizing the pressurization line (422). The transfer pump (420) may be operatively connected to the control system (115A, 115B). The control system (115A, 115B) may be configured to control the pressurization of the desanding system (125A, 125B) and/or the sand loading system (130A, 130B) via the pressurization line (422).

In some embodiments, the sand loading system (130A, 130B) may be configured to pressurize the scraper loading chamber (430) and/or the sand loading chamber (435) using the transfer pump (420). Even though FIG. 5 may show a single transfer pump, it will be apparent to a person having ordinary skill in the art that there may be more than one transfer pump operatively connected to the various systems and components of the sand removal system (10).

In some embodiments, the desanding system (125A, 125B) may be operatively coupled to a primary vessel (402) configured to receive a production fluid and sand inflow (401) from the production unit (120A, 120B). The primary vessel (402) is fluidly connected to the production unit (120A, 120B). The production fluid and sand inflow (401) is transported from the production unit (120A, 120B) to the primary vessel (402) via a production flowline. The primary vessel (402) is fluidly connected to a water jet line (403A) that includes one or more water jets (403B).

The water jet line (403A) is fluidly connected to a water supply (406) via the water inlet line (407) configured to supply water such as the produced water that has been treated. The one or more water jets (403B) are configured to inject water from the water supply (406) to agitate the production fluid and sand inflow (401) within the primary vessel (402) yielding an agitated fluid mixture of production fluid, sand, and jetted water from the water supply (406). In some embodiments, the water jet (403B) may be a hole in the water jet line (403A). In some embodiments, the water jet (403B) may be a water nozzle configured to direct pressurized water within the primary vessel (402).

In some embodiments, the water from the water supply (406) may be pressurized via the transfer pump (420) which may be operatively connected to the water inlet line (407). The agitated fluid mixture is transported from the primary vessel (402) to the separator (405) via an agitated fluid flowline (404) through one or more fluid valves (403C) configured to control flow through the agitated fluid flowline (404). The primary vessel (402) may be operatively connected to the transfer pump and pressurized to facilitate the flow of the agitated fluid mixture to the separator (405).

The desanding system (125A, 125B) includes a separator (405). The separator (405) includes a separator inlet (408), a separator body (413), and a collection boot (414). The agitated fluid mixture enters the separator (405) through the separator inlet (408) via the agitated fluid flowline (404) which is fluidly connected to the primary vessel (402) and the separator inlet (408). The separator (405) is configured to separate at least a portion of the production fluid (182) from the sand.

In some embodiments, the separator (405) may be a cyclone separator configured to separate at least a portion of the production fluid (182) from the sand using various forces and a difference in physical properties of the various components of the agitated fluid mixture. The agitated fluid mixture may be transported from the primary vessel (402) through the separator inlet (408). The separator (405) includes a separator body (413) that may have a conical shape with the upper portion wider than the lower portion. The separator inlet (408) may be angled so that the agitated fluid mixture entering the separator body (413) causes a rotation of the agitated fluid mixture within the separator body (413).

The various forces (e.g., gravity, buoyancy, fluid drag, friction, centrifugal force, and centripetal force) and the difference in physical properties (e.g., density) between the sand and rotating fluid (e.g., the production fluid and injected water) contributes to the sand separating from the production fluid (182) yielding a separated production fluid (409). In some embodiments, the separated production fluid (409) may also separate into different phases of heavier and lighter production fluids in terms of fluid density and/or American Petroleum Institute ("API") gravity. In some embodiments, the separated production fluid (409) may be further processed in the processing plant (117A, 117B, 117C).

In some embodiments, the separated production fluid (409) (e.g., at least a portion of the production fluid (182) and injected water) is discharged from the separator body (413) through a separator fluid outlet (412). The separator fluid outlet (412) may be angled so that the fluid may be captured and exits the separator (405). Even though FIG. 5 shows only one outlet for the outlet fluid flow, it will be apparent to a person having ordinary skill in the art that the separator may include more than one outlet for allowing different phases of the production fluid that may have separated into lighter and heavier phases without departing from the scope of the invention.

In some embodiments, the sand may accumulate at the base of the separator (405) within the collection boot (414) configured to receive the sand. The desanding system (125A, 125B) includes a sand discharge outlet (415). The sand discharge outlet (415) may be an opening at a base of the separator (405). The sand discharge outlet (415) is configured to discharge the quantity of sand (185) from the sand that has been separated from the production fluid (182) and has accumulated within the collection boot (414). In some embodiments, the desanding system (125A, 125B) may include a sand discharge valve configured to open and close the sand discharge outlet (415) in order to control the discharge of the quantity of sand (185). In some embodiments, the quantity of sand (185) may include a portion of fluid (e.g., the production fluid (182) and/or jetted water from the water supply (406)) that was not fully separated from the agitated fluid mixture within the separator (405).

In some embodiments, the desanding system (125A, 125B) includes an automated sand discharge valve (416) operatively connected to the desanding system (125A, 125B) and configured to automatically open and close the sand discharge outlet (415). The automated sand discharge valve (416) is operatively connected to the control system (115A, 115B) and is configured to open and close the sand discharge outlet (415) to discharge the quantity of sand (185) automatically. The automated sand discharge valve (416) may be configured to open when a predetermined quantity of sand has accumulated within the collection boot (414). The separator (405) may include hardware such as sensors to monitor the level of accumulated sand within the collection boot (414). The sensors may be operatively connected to the control system (115A, 115B). The control system (115A, 115B) is configured to control the opening and closing of the automated sand discharge valve (416).

In some embodiments, the desanding system (125A, 125B) may include a sand flow metering device (417) configured to measure a flow of the quantity of sand (185) from the sand discharge outlet (415). The sand removal system (10) may be configured to compare the flow of the quantity of sand (185) being discharged from the sand discharge outlet (415) to the sand level threshold (321). The sand removal system (10) may be configured to close the automated sand discharge valve (416), if the flow of the quantity of sand (185) is greater than the sand level threshold (321). In some embodiments, the desanding system (125A, 125B)

The sand loading system (130A, 130B) is configured to load the scraper device (180) into the scraper loading chamber (430). In some embodiments, the scraper device (180) may be manually loaded into the scraper loading chamber (430). In some embodiments, the sand loading system (130A, 130B) may include a lift device (not shown) configured to maneuver the scraper device (180) into the scraper loading chamber (430). The scraper loading chamber (430) may be an oversized section of the pipeline (150) configured to open and close to provide access to the pipeline (150) in order to load the scraper device (180). In some embodiments, the scraper loading chamber (430) may be configured to be pressurized for translating the scraper device (180) into the sand loading chamber (435).

The sand loading system (130A, 130B) is configured to translate the scraper device (180) from the scraper loading chamber (430) into the sand loading chamber (435) through a separation gate (432). In some embodiments, the scraper device (180) may be manually maneuvered into the sand loading chamber (435) through the separation gate (432). In some embodiments, the sand loading system (130A, 130B) may pressurize the scraper loading chamber (430) and use a fluid flow to translate the scraper device (180) into the sand loading chamber (435) through the separation gate (432). The separation gate (432) is configured to allow the scraper device (180) to pass through the separation gate (432) and to facilitate positioning the scraper device (180) so as to receive the quantity of sand (185) from the separator (405).

The sand loading system (130A, 130B) is configured to position the scraper device (180) to receive the quantity of sand (185) from the desanding system (125A, 125B) using the separation gate (432) and the sand loading chamber (435). The sand loading chamber (435) and the separation gate (432) may define a loading area shape and size so that after the scraper device (180) is positioned into the sand loading chamber (435), the scraper device (180) is positioned beneath the separator (405). The scraper device (180) of the sand loading system (130A, 130B) is configured to receive the quantity of sand (185) into the sand collection chamber (205) discharged through the sand discharge outlet (415) of the desanding system (125A, 125B). The automated sand discharge valve (416) may be opened to allow the quantity of sand (185) to be discharged into the sand collection chamber (205).

The sand loading system (130A, 130B) is configured to translate the scraper device (180) into the pipeline (150) from the sand loading chamber (435). This may be done by pressurizing the sand loading chamber (435) using the transfer pump (420). The sand loading chamber (435) is operatively connected to the pipeline (150). The sand loading system (130A, 130B) is configured to transport the scraper device (180) from the offshore facility (110A, 110B) through the pipeline (150). In some embodiments, the fluid (e.g., the production fluid (182) and/or the separated production fluid (409)) within the pipeline (150) may be used to propel the scraper device (180) to the onshore facility (111). In some embodiments, the scraper loading chamber (430) and the sand loading chamber (435) may both be pressurized to translate the scraper device (180) into the pipeline (150) from the sand loading chamber (435).

FIG. 5 depicts a flowchart in accordance with one or more embodiments describing a method for removal of sand from an offshore facility (hereafter "sand removal method" (500)). In some embodiments, the sand removal method (500) may use the sand removal system (10). Although the steps in flowchart using the sand removal method (500) are shown in sequential order, it will be apparent to one of ordinary skill in the art that some steps may be conducted in parallel, in a different order than shown, or may be omitted without departing form the scope of the invention.

In step (501), the sand removal method (500) may include loading the scraper device (180) into the scraper loading chamber (430). Loading the scraper device (180) may include opening the scraper loading chamber (430) in order to load the scraper device (180). Loading the scraper device (180) may include maneuvering the scraper device (180) into the scraper loading chamber (430) using the lift device (not shown) configured to maneuver the scraper device (180).

In step (502), the sand removal method (500) may include translating the scraper device (180) from the scraper loading chamber (430) into the sand loading chamber (435) through a separation gate (432). In some embodiments, the sand removal method (500) may include opening the separation gate (432) to allow the scraper device (180) to translate. In some embodiments, the sand removal method (500) may include pressurizing the scraper loading chamber (430) to facilitate translating the scraper device (180) into the sand loading chamber (435).

In step (503), the sand removal method (500) may include positioning the scraper device (180) to receive the quantity of sand (185) from the desanding system (125A, 125B) using the separation gate (432) and the sand loading chamber (435). Positioning the scraper device (180) may include closing the separation gate (432) to confine the scraper device (180) within the sand loading chamber (435) configured to position the scraper device (180) beneath the sand discharge outlet (415). In step (504), the sand removal method (500) may include opening the chamber door (300) of the scraper device (180). The chamber door (300) may be opened automatically using the control system (115A, 115B, 115C).

In step (505), the sand removal method (500) may include receiving the quantity of sand (185) into the sand collection chamber (205) from the desanding system (125A, 125B).

The sand removal method (500) may include opening the chamber door (300) of the scraper device (180) in order to receive the quantity of sand (185). In step (506), the sand removal method (500) may include closing the chamber door (300) to enclose the sand collection chamber (205).

In step (507), the sand removal method (500) may include pressurizing the sand loading chamber (435). The sand removal method (500) may include closing the chamber door (300) of the scraper device (180) in order to encompass the sand collection chamber (205) in order to pressurize the sand loading chamber (435) and to transport the quantity of sand (185).

In step (508), the sand removal method (500) may include translating the scraper device (180) into the pipeline (150) from the sand loading chamber (435). The sand removal method (500) may include pressurizing the sand loading chamber (435) in order to translate the scraper device (180) into the pipeline (150).

In step (509), the sand removal method (500) may include transporting the scraper device (180) from the offshore facility (110A, 110B) through the pipeline (150). Transporting the scraper device (180) may include transporting the scraper device (180) using the fluid (e.g., the production fluid (182) and/or the separated production fluid (409)) within the pipeline (150) to propel the scraper device (180).

In some embodiments, the sand removal method (500) may include distributing the quantity of sand (185) within the sand collection chamber (205) using the sand distribution device (215) configured to distribute the quantity of sand (185) within the sand collection chamber (205). Distributing the quantity of sand (185) may include distributing the quantity of sand (185) laterally using the sand distribution device (215) such as the distribution wedge.

In some embodiments, transporting the scraper device (180) through the pipeline (150) may include transporting the scraper device (180) through the pipeline (150) to an onshore facility (111) configured to receive the scraper device (180). In some embodiments, transporting the scraper device (180) from the offshore facility (110A, 110B) through the pipeline (150) may include cleaning the pipeline (150) using the scraper flange (210) as the scraper device (180) is transported from the offshore facility (110A, 110B) to the onshore facility (111) or another offshore facility.

The sand removal method (500) may include offloading the quantity of sand (185) at the onshore facility (111). The sand removal method (500) may include transporting, using the transport vehicle (137), the quantity of sand (185) to a sand processing facility (not shown) to further treat the quantity of sand (185) for cleaning and disposal or for cleaning and repurposing the quantity of sand (185). Repurposing the quantity of sand (185) may include using for construction operations of infrastructure such as facilities and/or well pads.

The sand removal method (500) may include measuring the flow of the quantity of sand (185) from the sand discharge outlet (415). The sand removal method (500) may include comparing, using the sand flow metering device (417), the flow of the quantity of sand (185) being discharged from the sand discharge outlet (415) to the sand level threshold (321). The sand removal method (500) may include closing the automated sand discharge valve (416) if the flow of the quantity of sand (185) is greater than the sand level threshold (321).

Embodiments of the present disclosure may provide at least one of the following advantages. The disclosed invention provides an improvement on transporting sand from offshore facilities. Sand is placed in an improved scraper device configured to hold sand. The improved scraper devices are transported to onshore facilities in pipelines thereby reducing carbon emissions from motorized vehicles. The disclosed method for sand removal may improve worker safety by reducing trips of motorized vehicles to the offshore facilities often completed in water areas such as oceans that can posed danger to workers in transferring sand to the motorized vehicles such as boats from the offshore facilities.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A scraper device for removal of sand from an offshore facility having a pipeline, the scraper device comprising:

a scraper body comprising a scraper flange configured to clean an inner wall of the pipeline;

a sand collection chamber disposed within the scraper body and configured to receive a quantity of sand; and a chamber door operatively connected to the scraper body within a body cavity formed in an inner wall of the scraper body, the chamber door configured to slidably pivot circumferentially around the scraper body into an open position or a closed position, thereby opening or sealing the sand collection chamber, wherein the scraper device is configured to be transported through the pipeline.

2. The scraper device of claim 1, further comprises a sand distribution device disposed in the sand collection chamber, wherein the sand distribution device is configured to distribute the quantity of sand within the sand collection chamber.

3. The scraper device of claim 2, wherein the sand distribution device comprises a distribution wedge disposed in the sand collection chamber and is configured to divert the quantity of sand laterally to each side of the distribution wedge.

4. The scraper device of claim 1, wherein the scraper device is configured to be transported in a pressurized pipeline.

5. A system for sand removal from an offshore facility having a pipeline, the system comprising:

a desanding system configured to discharge a quantity of sand;

a scraper device comprising:

a scraper body comprising a scraper flange configured to scrape an inner wall of the pipeline, a sand collection chamber disposed within the scraper body and configured to receive the quantity of sand discharged from the desanding system, and a chamber door operatively connected to the scraper body and configured to enclose the sand collection chamber, wherein the scraper device is configured to be transported through the pipeline; and a sand loading system operatively connected to the desanding system and configured to:

load the scraper device into a scraper loading chamber, translate the scraper device from the scraper loading chamber into a sand loading chamber through a separation gate;

position the scraper device to receive the quantity of sand from the desanding system using the separation gate and the sand loading chamber;

receive the quantity of sand from the desanding system into the sand collection chamber of the scraper device;

pressurize the sand loading chamber;

translate the scraper device into the pipeline from the sand loading chamber; and transport the scraper device from the offshore facility through the pipeline.

6. The system of claim 5, wherein the scraper device comprises a sand distribution device disposed in the sand collection chamber, wherein the sand distribution device is configured to distribute the quantity of sand within the sand collection chamber.

7. The scraper device of claim 6, wherein the sand distribution device comprises a distribution wedge disposed in the sand collection chamber and is configured to divert the quantity of sand laterally to each side of the distribution wedge.

8. The system of claim 5, wherein the desanding system comprises:

a sand discharge outlet; and an automated sand discharge valve operatively connected to the desanding system and configured to automatically close the sand discharge outlet.

9. The system of claim 8, further comprising a sand flow metering device configured to:

measure a flow of the quantity of sand from the sand discharge outlet;

compare the flow of the quantity of sand being discharged from the sand discharge outlet to a sand level threshold; and closing the automated sand discharge valve if the flow of the quantity of sand is greater than the sand level threshold.

10. The system of claim 5, wherein the chamber door is configured to slidably pivot circumferentially around the scraper body in order to open and close the sand collection chamber.

11. The system of claim 5, wherein the sand loading system is further configured to pressurize the scraper loading chamber.

12. The system of claim 5, further comprising a sand offloading system configured to receive the scraper device and offload the quantity of sand at an onshore facility.

13. The system of claim 5, wherein the scraper device is configured to be transported in a pressurized pipeline.

14. A method for sand removal from an offshore facility having a pipeline, the method comprising:

loading a scraper device into a scraper loading chamber, wherein the scraper device comprises a sand collection chamber;

translating the scraper device from the scraper loading chamber into a sand loading chamber through a separation gate;

positioning the scraper device to receive a quantity of sand from a desanding system using the separation gate and the sand loading chamber;

opening a chamber door of the scraper device;

receiving the quantity of sand into the sand collection chamber from the desanding system;

closing the chamber door to enclose the sand collection chamber;

pressurizing the sand loading chamber;

translating the scraper device into the pipeline from the sand loading chamber; and transporting the scraper device from the offshore facility through the pipeline.

15. The method of claim 14, further comprising distributing the quantity of sand within the sand collection chamber using a sand distribution device configured to distribute the quantity of sand within the sand collection chamber.

16. The method of claim 14, wherein transporting the scraper device through the pipeline comprises transporting the scraper device through the pipeline to an onshore facility configured to receive the scraper device.

17. The method of claim 16, further comprising offloading the quantity of sand at the onshore facility.

18. The method of claim 14, further comprising:

measuring a flow of the quantity of sand from a sand discharge outlet;

comparing, using a sand flow metering device, the flow of the quantity of sand being discharged from the sand discharge outlet to a sand level threshold; and closing an automated sand discharge valve if the flow of the quantity of sand is greater than the sand level threshold.

19. The method of claim 14, wherein the scraper device comprises a scraper body having a scraper flange, wherein transporting the scraper device from the offshore facility through the pipeline comprises cleaning the pipeline using the scraper flange as the scraper device is transported from the offshore facility.

* * * * *